Figure 1:
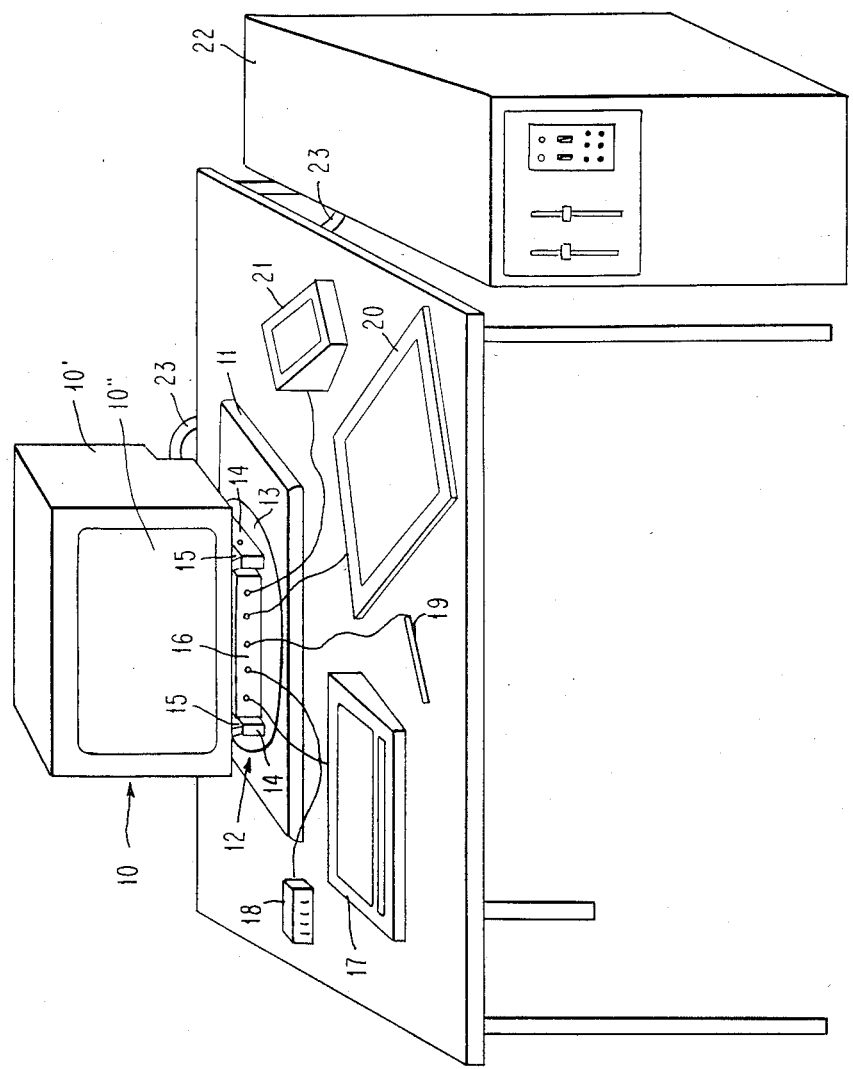

United States Patent [19]

Barr et al.

[11] Patent Number: 4,577,187

[45] Date of Patent: Mar. 18, 1986

[54] DISPLAY WORKSTATION

[75] Inventors: Millard G. Barr, Shokan; William H. Barrett, Woodstock; Joseph W. Braidt, New Paltz; John F. Driscoll; Joseph A. Gregory, both of Kingston; Samuel A. Lucente, Glenford; Louis J. Remsburger, Pine Plains, all of N.Y.

[73] Assignee: International Business Machines Corporation, Armonk, N.Y.

[21] Appl. No.: 543,741

[22] Filed: Oct. 20, 1983

[51] Int. Cl.⁴ .................. G09F 1/00; A47B 91/00; F16M 1/00

[52] U.S. Cl. ............................. 340/700; 340/709; 312/198; 108/5; 108/94; 248/346; 248/664

[58] Field of Search ............ 340/709, 789, 365 R, 340/700; 248/183, 184, 346, 349, 442.2, 664; 312/198; 108/5, 94, 95, 140; 361/393

[56] References Cited

U.S. PATENT DOCUMENTS

| | | | |
|---|---|---|---|
| 3,603,545 | 9/1971 | Boniface | 248/184 |
| 3,809,395 | 5/1974 | Allison, Jr. et al. | 340/709 X |
| 4,064,560 | 12/1977 | Baxter | 340/365 R X |
| 4,208,081 | 6/1980 | Kekas et al. | 340/365 R |
| 4,259,668 | 3/1981 | Nishimura et al. | 340/711 |
| 4,306,232 | 12/1981 | Burson | 340/709 X |
| 4,313,112 | 1/1982 | Foster | 340/365 R |
| 4,326,193 | 4/1982 | Markley et al. | 340/365 R |
| 4,330,776 | 5/1982 | Dennison, Jr. et al. | 340/365 R |
| 4,349,173 | 9/1982 | Volka et al. | 248/346 |
| 4,368,867 | 1/1983 | Pendleton et al. | 246/346 |
| 4,410,159 | 10/1983 | McVicker et al. | 248/349 |
| 4,451,701 | 5/1984 | Bendig | 340/719 X |
| 4,474,352 | 10/1984 | Nishi | 248/183 X |
| 4,496,200 | 1/1985 | Hagstrom et al. | 248/442.2 X |

FOREIGN PATENT DOCUMENTS 3132015  8/1981  Fed. Rep. of Germany ...... 248/184

*Primary Examiner*—Marshall M. Curtis
*Assistant Examiner*—Vincent P. Kovalick
*Attorney, Agent, or Firm*—George E. Clark

[57] ABSTRACT

A display workstation comprising a display monitor including an image display device mounted on a base by a mechanism permitting adjustment of the angle of tilt of the image display device, the tilt mechanism including a pair of support members upstanding from the base and providing a gap between the display device and the base between the support members. A cable connector housing is releasably retained in the gap between the support members. Individual cables from peripheral input devices extend to the front of and are releasably coupled to the housing, and a further cable is also coupled to the housing and extends from the rear thereof to a separate display control unit. The housing contains circuits providing electrical connection between the peripheral device cables and the control unit cable.

12 Claims, 9 Drawing Figures

DISPLAY WORKSTATION

This invention concerns a display workstation of the kind which comprises a display monitor for the display of alphanumeric and/or graphic images, a separate display control unit usually attached to a remote host, and a plurality of peripheral input devices electrically connected to the control unit to permit the user to interact with the displayed image. Typical workstations of this kind are the IBM 3250 graphics display system and the IBM 3279 color display system.

In such workstations, the peripheral input devices, for example, digitizing tablet, light pen, alphanumeric and programmed function keyboards, valuators, etc., have individual cables which are electrically connected to the display control unit, the latter in turn being electrically connected to the monitor to drive the display. A problem with this kind of workstation is to provide a cabling system which is tidy and yet which is readily accessible and provides flexibility to accommodate future functional extensions and/or changes of the workstation.

Some existing systems provide little or no cable management, permitting individual cables to trail over desks and tables and across the floor for connection to the various units. This not only presents a very unattractive appearance, but also provides a safety hazard due to the possibility of tripping over loose cables.

Other systems connect their peripheral device cables to the display monitor itself, usually in a relatively inaccessible position, with a further connection from the monitor to the control unit. Thus, in the IBM 3279 the alphanumeric keyboard cable is positioned under the base of the monitor by lifting up one side of the monitor and laying the cable from the front to the rear. The cable is then plugged into the back of the monitor. A disadvantage with this approach is that a significant effort is required to lift the monitor to lay the keyboard cable in position under the base, which often requires two people due to the weight of the monitor, and the possibility of damage to the monitor if the lifted side is inadvertently dropped during this operation. Also, this approach to cable management is inconsistent, the keyboard cable being located unobtrusively beneath the monitor while the other peripheral device cables, which also plug into the back of the monitor, trail freely around the side of the monitor.

In the IBM 3250, the peripheral device cables are secured to the base of the monitor at the front, and a further cable from the rear of the base of the monitor leads to the control unit, the peripheral device cables and the cable to the control unit being electrically connected in the base. While this avoids trailing cables and provides a consistent approach it has the disadvantage that the individual cables are attached very low on the base in a relatively inaccessible position.

In both cases, the electrical connections between the peripheral device cables and the control unit cable are fixed in the sense that they cannot readily support functions additional or different to those originally designed into these connections.

It is therefore an object of the invention to provide a display workstation with an improved cable management system as compared to the systems described above.

Accordingly, the invention provides a display workstation comprising a display monitor including an image display device mounted on a base, a cable connector means releasably coupled to the monitor in a position below the viewing screen of the display device, a plurality of peripheral input devices with individual cables which extend to and are releasably coupled to the cable connector means, a separate display control unit, and at least one further cable coupled to the cable connector means and extending therefrom to the control unit, the cable connector means providing electrical connections between the peripheral device cables and the cable to the control unit.

The advantage of the invention is that the cables are readily accessible and can therefore be removed and replaced in whole or in part without significant manual effort. The invention also provides for future extensions and/or changes in the workstation by avoiding fixed connections within the monitor or base itself. Furthermore, the arrangement presents a neat and tidy appearance to the workstation.

In the preferred embodiment the image display device is mounted on its base by a mechanism permitting adjustment of the angle of tilt of the image display device, the tilt mechanism including a pair of support members upstanding from the base and providing a gap between the image display device and the base between the support members, and the cable connector means comprises a housing which is releasably retained in the gap between the support members. The individual cables of the peripheral input devices extend to the front of and are releasably coupled to the housing, and the control unit cable is also coupled to the housing and extends from the rear thereof to the control unit. The housing contains circuits providing electrical connection between the peripheral device cables and the control unit cable. Such circuits may provide a straight-through connection or a change in data format for one or more of the peripheral input devices.

Figure 2:
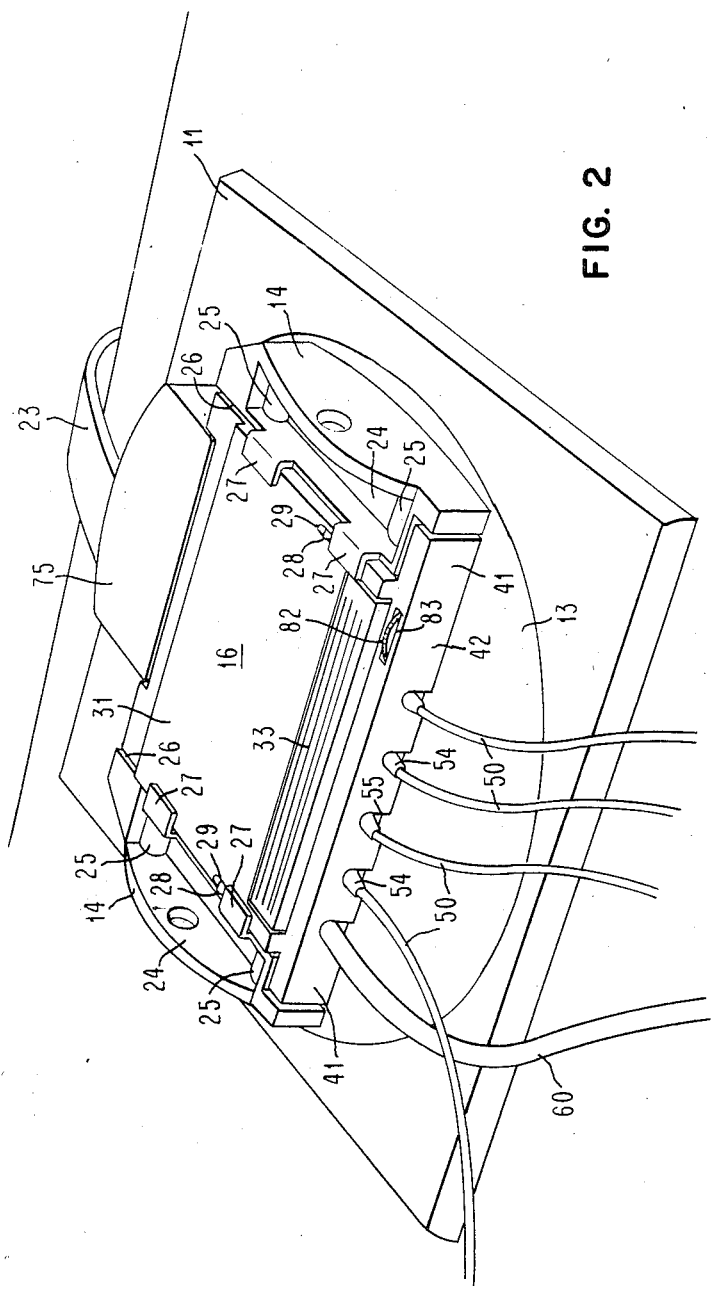
Figure 3:
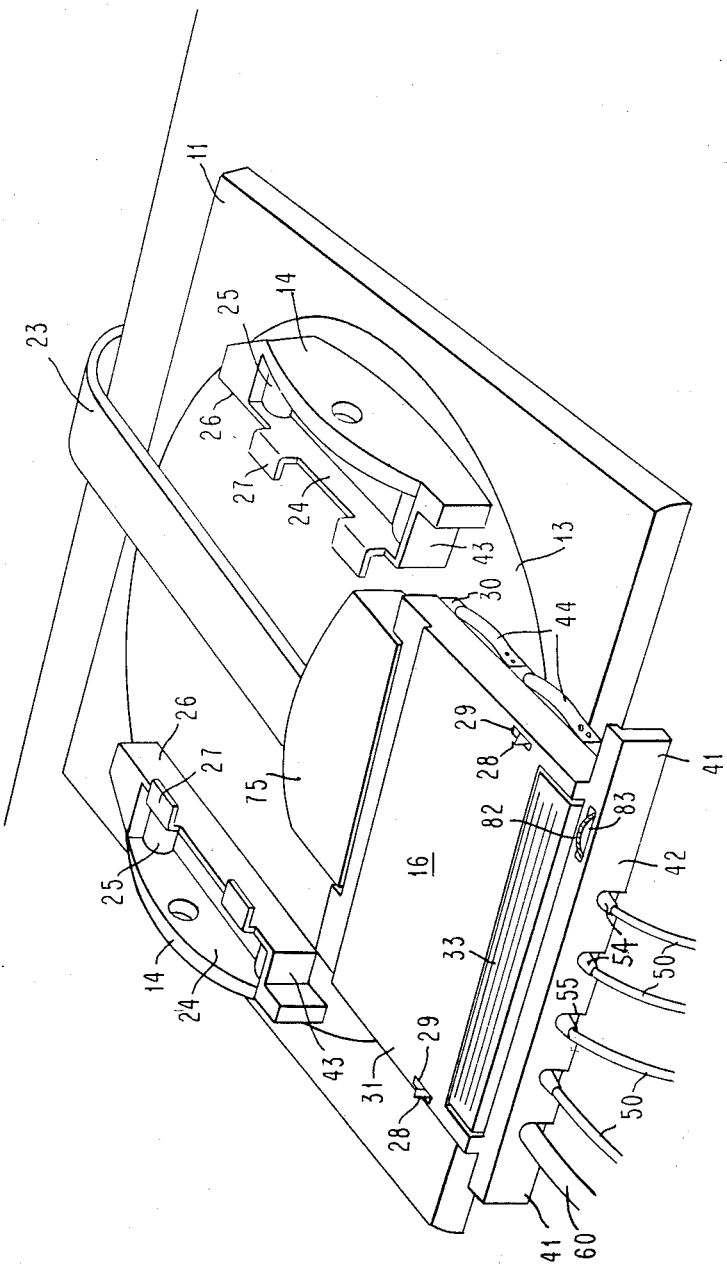
Figure 4:
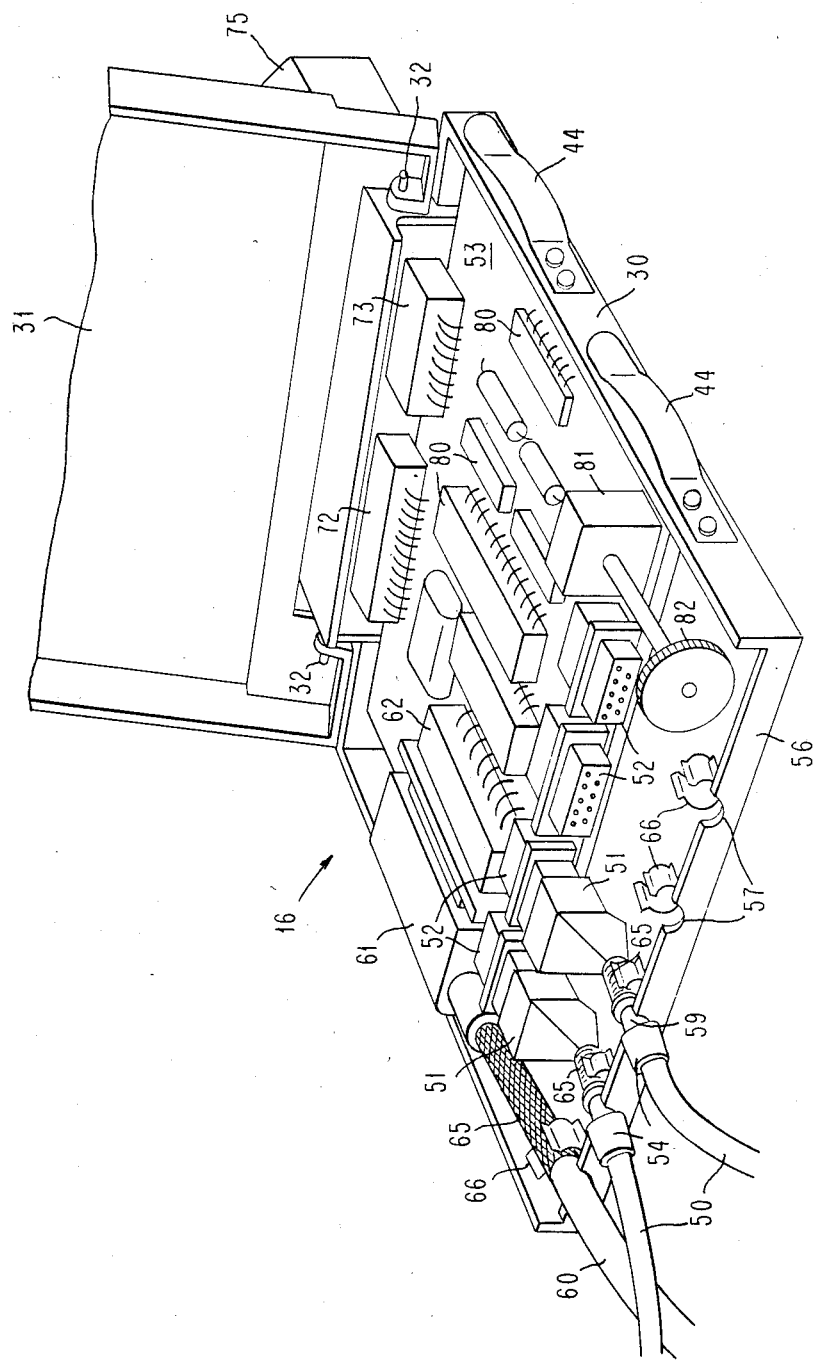
Figure 5:
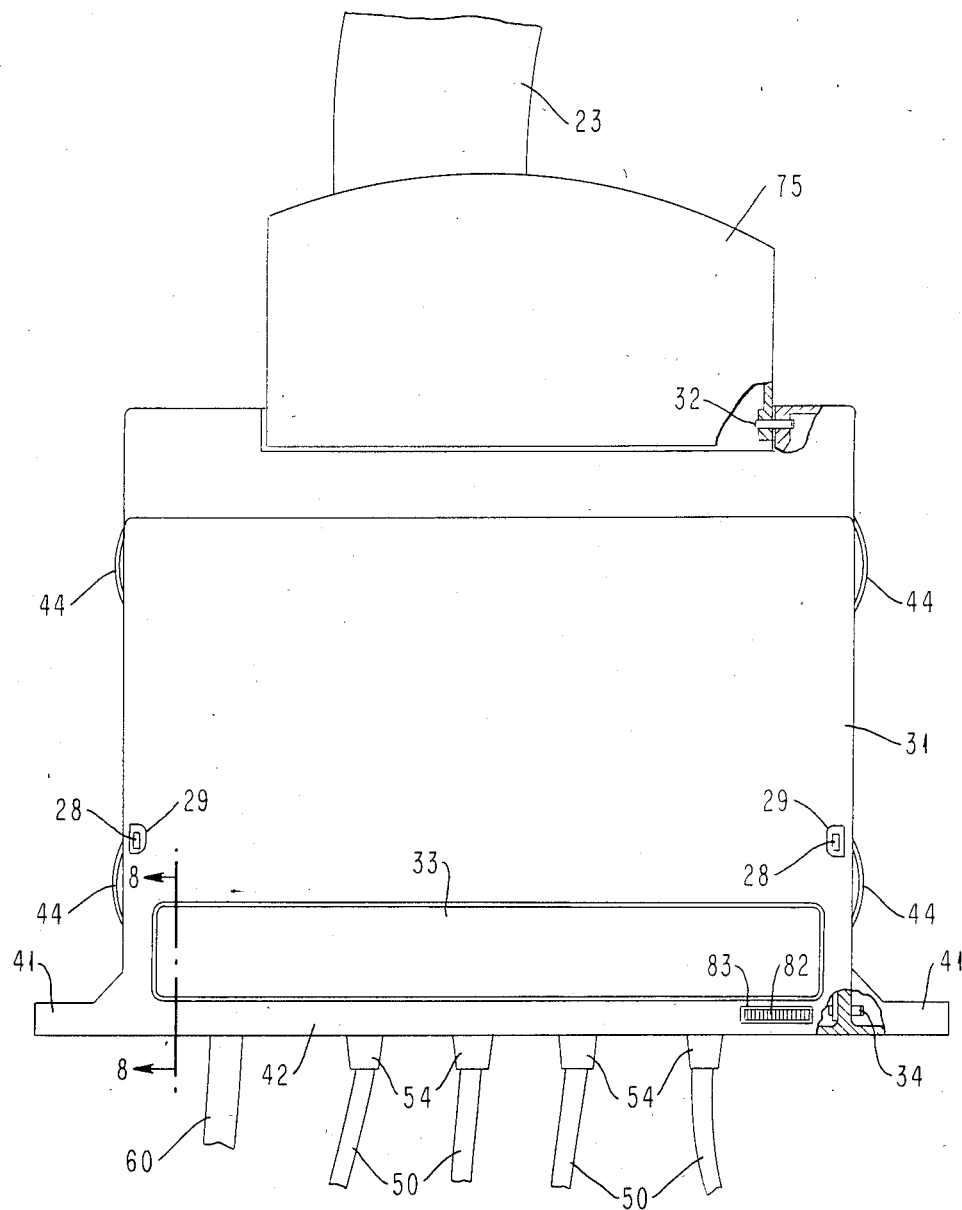
Figure 6:
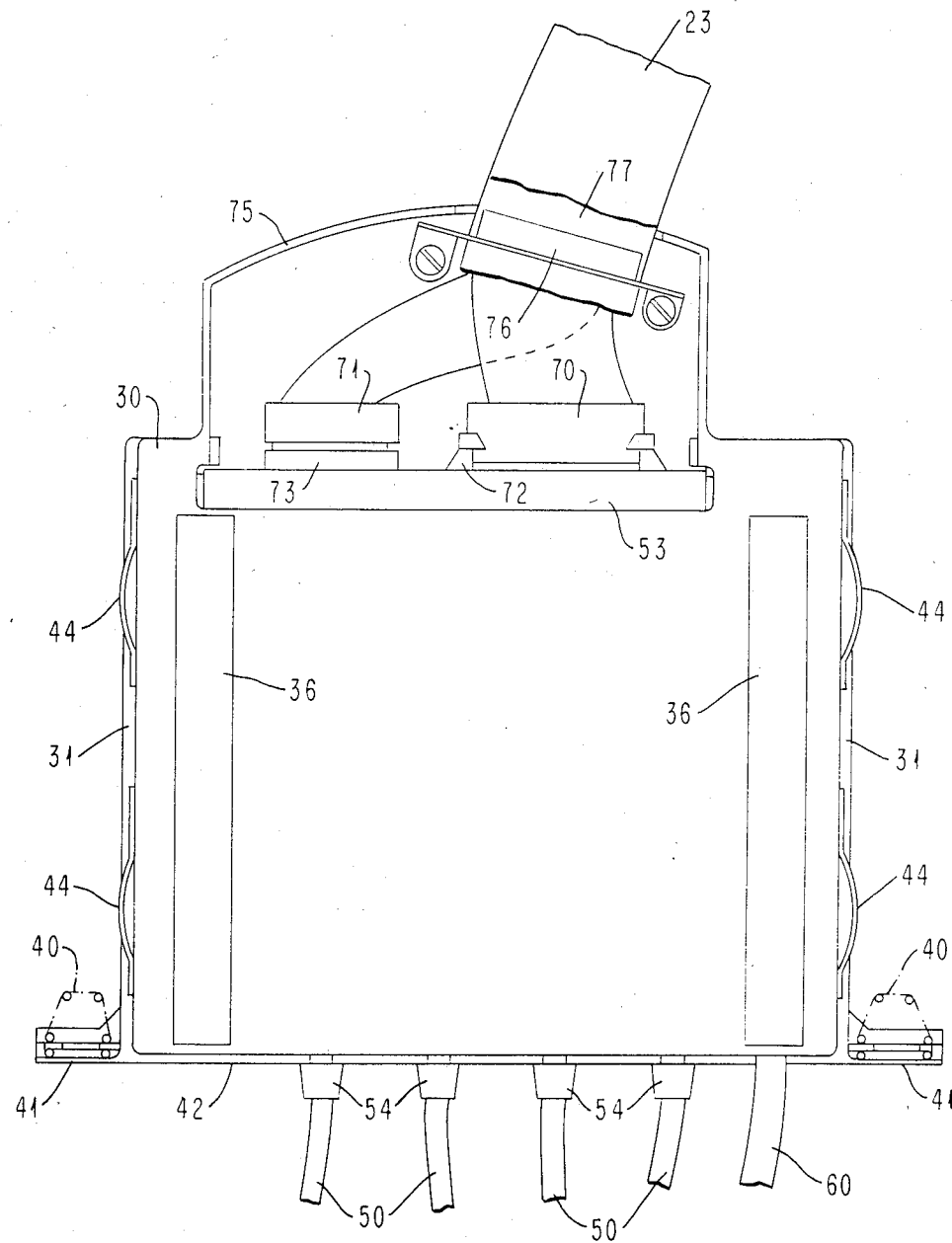
Figure 7:
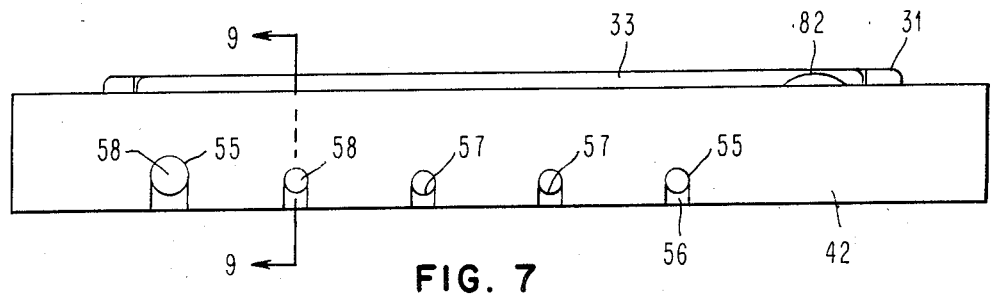
Figure 8:
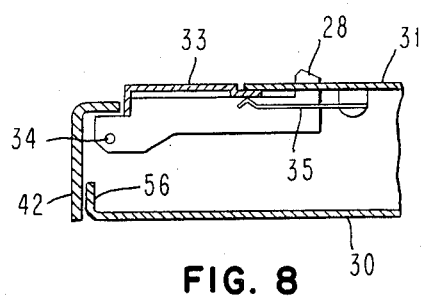
Figure 9:
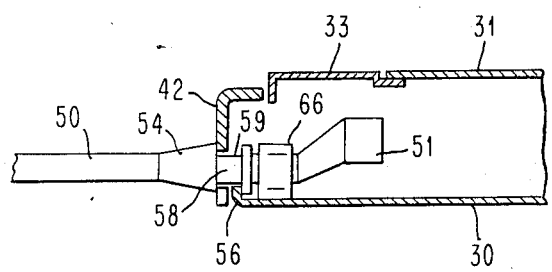

An embodiment of the invention will now be described, by way of example, with reference to the accompanying drawings, in which:

FIG. 1 is a schematic overall view of a display workstation embodying the present invention, FIG. 2 is an external perspective view of the cable connector housing of FIG. 1, the housing being shown in its operative position between the tilt support brackets and with the image display device omitted, FIG. 3 is a view similar to FIG. 2 but with the cable connector housing and released and slid forwardly from its operative position, FIG. 4 is a perspective view of the cable connector housing with its lid open for the removal or insertion of peripheral input device cables, FIG. 5 is a detailed top plan view of the cable connector housing, FIG. 6 is a detailed bottom view of the cable connector housing, FIG. 7 is a front view of the cable connector housing, FIG. 8 is a cross-section taken on line 8—8 of FIG. 5, and FIG. 9 is a cross-section taken on line 9—9 of FIG. 7.

The display workstation, FIG. 1, comprises a display monitor 10 including an image display device 10', such as a CRT having a viewing screen 10'', and a base 11 on which the device 10' is mounted by a tilt and swivel mechanism indicated generally at 12. The swivel motion, i.e., side to side rotation of the device 10' about a substantially vertical axis, is provided by a turntable 13 rotatably mounted in the base 11 in a conventional manner. The tilt motion, i.e., forward and rearward rotation of the device 10' about a substantially horizontal axis, is provided by a pair of upstanding laterally spaced support brackets 14 mounted on the turntable 13 and a pair of cooperating brackets 15 which are fixed to and extend downwardly from the underside of the image display device 10'.

Between the support brackets 14 the tilt mechanism 14, 15 provides a gap or recess between the underside of the image display device 10' and the base 11, and a cable connector housing 16 is inserted into and releasably retained in this gap. The housing 16 is sufficiently shallow not to interfere with the tilt action of the device 10' within the angular range provided by the tilt mechanism.

The workstation is shown with a typical set of peripheral input devices such as an alphanumeric keyboard 17, valuators 18, a light pen 19, a digitizing table 20 and a lighted programmed function keyboard (LPFK) 21. Each of these has an individual cable which extends to the front of and is releasably coupled to the housing 16.

The workstation includes a separate control unit 22, and a flat flexible multi-conductor cable 23 is coupled to the rear of the housing 16 and extends therefrom to the control unit 22. The housing 16 contains circuits which provide the desired electrical connections between the individual peripheral device cables and the control unit cable 23, and serves as a power distribution and signal interface point.

Each support bracket 14 has a recess 24, FIGS. 2 and 3, to accommodate a respective bracket 15 of the image display device 10'. Each recess 24 includes a pair of rollers 25 mounted respectively at the front and rear of the recess 24 to provide bearings for the lower surface of the respective bracket 15 (not shown in FIGS. 2 and 3). The lower surface of each bracket 15 is arcuate and therefore the image display device 10' may be tilted forwardly and rearwardly by rotation of the arcuate surfaces of the brackets 15 on the roller bearings 25.

The housing 16 is of metal and comprises a base portion 30 and a lid 31, FIG. 4, the lid 31 being hinged to the rear of the base portion 30 by pivot pins 32, FIGS. 4 and 5. In its operative position, FIG. 2, the lid 31 of the housing 16 is closed and the housing fits snugly between the parallel inside surfaces 26 of the brackets 14, and a pair of inwardly extending lugs 27 on the brackets 14 closely embrace the top surface of the housing 16 along opposite side edges. Positive retention of the housing 16 in this position is effected by a pair of spring-loaded catches 28 which protrude upwardly through respective apertures 29 in the housing and engage behind the rear edge of the foremost lug 27 of each pair. The housing 16 is stabilized in its operative position against any slight movement in the front to rear direction by a pair of coil springs 40, FIG. 6, the springs 40 being retained behind lateral extensions 41 of the front wall 42 of the lid 31 and being compressed against forward facing surfaces 43 of the brackets 14, FIG. 3. Side to side stabilization is achieved by a pair of outwardly bowed leaf springs 44, FIGS. 3 to 6, located along each side of the base portion 30 and which bear against the parallel surfaces 26 on the inside of the brackets 14.

The catches 28 are pivoted at 34, FIGS. 5 and 8, to the sides of the lid 31 internally of the housing 16 and a release bar 33 extends across and is fixed to the upper edges of the catches. The release bar 33 and hence the catches 28 are biassed upwardly by two leaf springs 35 which bear on the underside of the release bar 33 and are disposed one adjacent each catch 28. Thus the catches 28 may be withdrawn into the apertures 29 by manual depression of the release bar 33, which is exposed along the front edge of the housing lid 31, whereby the housing 16 may be slid forwardly from between the support brackets 14, FIG. 3. Only when the housing 16 is thus removed from between the brackets 14 may the lid 31 be opened, FIG. 4.

The four peripheral device cables 50, FIGS. 2 and 3, for the valuators 18, light pen 19, tablet 20 and LPFK 21 terminate in multi-pin plugs 51, FIG. 4, which plug into corresponding sockets 52 mounted on a printed circuit board (PCB) 53 within the housing 16. Each cable 50 has a collar 54 molded thereto adjacent the plug 51, each collar 54 having an annular groove 59. The front wall 42 of the lid 31 comprises a plurality of vertical slots 55 with semicircular upper ends, FIGS. 2, 3 and 7, and the front wall 56 of the base portion 30 comprises a corresponding plurality of semicircular recesses 57, FIGS. 4 and 7. When the lid 31 is closed the front wall 42 thereof overlaps the front wall 56 of the base portion 30 so that the slots 55 and recesses 57 together define a plurality of circular apertures 58 in front of each socket 52. These apertures 58 engage the groove 59 in each collar 54, as shown in FIG. 9, thereby providing a positive retention or locking of each cable 50 when the lid 31 is closed.

The cable 60 from the alphanumeric keyboard 17 is thicker than the cables 50 and does not have a collar 54, thus its aperture 58 is correspondingly larger as seen on the left in FIG. 7.

The cable 60 terminates in a multi-pin plug 61 which cooperates with a corresponding socket 62 mounted on the PCB 53. Since the direction of insertion of the plug 61 into the socket 62 is parallel to the front of the housing 16 the cable 60 is automatically retained in position when the lid 31 is closed.

Each cable 50 and 60 includes a ground shield 65, FIG. 4, of which a part is exposed adjacent the respective plug 51 or 61 and engages in a respective metal fuse clip 66 fixed to the inside surface of the metal base portion 30. The tilt support brackets 14 are also metal, so that a ground connection is established via the clips 66, base portion 30 and springs 44 to the brackets 14. These brackets 14 are in turn electrically connected to the main body of the monitor base 11, which is metal, and the latter is earthed.

The control unit cable 23 is a multi-conductor flexible cable which both takes the signals from the peripheral input devices 17 to 21 to the control unit 22, and also supplies power to these devices and to the circuits on the PCB 53. The cable 23 terminates in two multi-pin plugs 70 and 71, FIG. 6, for signals out and power in respectively, and these plug into corresponding sockets 72 and 73 on the PCB 53 (see also FIG. 4). The cable 23 enters the housing 16 under a rearwardly extending cover 75 integral with the base portion 30, the cable being retained in position by a metal clamp 76 which makes electrical connection to an exposed portion of the ground shield 77 of the cable.

The exact nature and function of the various other circuit components 80, FIG. 4, mounted on the PCB 53 is not critical to the present invention. At a minimum the circuitry on the PCB 53 will provide straight-through connections for the signals from the peripheral device cables 50 and 60 to the control unit cable 23, and also supply power in the reverse direction to the peripheral input devices. However, it is preferable that the PCB circuitry also provide some signal processing in order to relieve the control unit 22 of this task. Thus, since the alphanumeric keyboard 17 normally provides parallel signals, it is preferred that the PCB circuitry change these to serial format to correspond to the serial format of the signals from the other peripheral input devices. The manner in which such parallel-to-serial signal conversion may be performed is well known and does not need further description. The PCB 53 also advantageously includes an audible alarm volume control 81 with a thumbwheel 82 which projects partially through the top of the housing 16 through an aperture 83, see FIGS. 2, 3, and 5.

The cabling arrangement described above has significant advantages over prior systems:

(1) It avoids a maze of cables on the desk top on which the monitor and peripheral input devices are located. This reduces the desk top space requirements and improves the ergonomics of the system hardware.

(2) The ready attachment and detachment of cables permits user installation without significant effort and without the use of special tools. Faulty devices may also be readily replaced by the user.

(3) The PCB in the cable connector housing provides for flexibility of peripheral input device configurations, since different configurations may be supported by changing the PCB circuitry. Alternatively, if the PCB circuitry includes a microprocessor, these changes may be supported by microcode change.

(4) The metal housing provides isolation of the PCB circuitry from electromagnetic disturbances originating from the monitor and vice versa, and all peripheral devices are electrostatically grounded via the housing and monitor base.

While, as described above, the invention is most effectively embodied in a monitor whose image display device is mounted on a separate base by a tilt mechanism having a pair of upstanding tilt support members with a gap between them, the advantages of the invention can also be obtained in the case of an image display device having an integral base, i.e., where the base in fact forms the lower part of the overall cabinet or housing of the monitor, and also in the case of a monitor whose tilt mechanism does not provide a gap as aforesaid or at least not a sufficient gap for the purpose required. In these cases, the base or monitor housing can be provided with a slot or recess below the viewing screen which is adapted to accommodate a cable connector housing similar to that described above. Furthermore, although the cable connector housing has been shown as releasably coupled to the base of the monitor, it could alternatively be releasably coupled to the underside of the image display device between the tilt support brackets.

We claim:

1. A display workstation comprising a display monitor, having a viewing screen, a cable connector means releasably coupled to the monitor in a position below the viewing screen, a plurality of input devices with individual cables which extend to and are releasably coupled to the cable connector means, a separate display control unit, and at least one further cable coupled to the cable connector means and extending therefrom to the control unit, the cable connector means providing electrical connections between the input device cables and the cable to the control unit.

2. A display workstation according to claim 1, wherein the cable connector means comprises a housing, said housing containing circuit means providing said electrical connections.

3. A display workstation according to claim 2, wherein the display monitor comprises an image display device mounted on a base by a mechanism permitting adjustment of an angle of tilt of the image display device, a tilt mechanism including a pair of support members upstanding from the base and providing a gap between the image display device and the base between the support members, and wherein the housing is located in said gap between the support members.

4. A workstation according to claim 3, wherein said housing further comprises means for slidably removing said housing from between said support members and means for retaining said input device cables, said retaining means operable to release said device cables only after said housing has been removed from between said support members.

5. A workstation according to claim 4, wherein said housing further comprises a base portion and a hinged lid attached to said base portion, said lid having openings therein on one end thereof, said openings being large enough to permit passage for said input device cables but smaller than cable connectors attached to said input device cables to prevent release of said cables when said lid in closed to said base portion.

6. A workstation according to claim 2, wherein the circuit means in the housing includes means to change the format of data supplied by at least one input device.

7. A workstation according to any one of claims 2 to 6 wherein the housing is metal and the input device cables each include a ground shield which is electrically connected to the housing, and wherein the metal housing is electrically connected to a metal portion of the monitor which is grounded.

8. A workstation according to any one of claims 3 to 6, wherein the base includes a swivel mechanism in the form of a turntable and the support members are mounted on the turntable.

9. A display workstation comprising a display monitor including an image display device mounted on a base by a support means providing a gap between the image display device and the base, a separate display control unit, and a plurality of input devices electrically connected by cabling to the control unit, the cabling from the input devices to the control unit being routed through said gap.

10. A display workstation according to claim 9, wherein the support means comprises a tilt mechanism including a pair of support members upstanding from the base, said gap through which the cabling is routed being between the support members.

11. A display workstation according to claim 10, wherein the cabling includes individual cables from the input devices to the monitor and at least one further cable from the monitor to the control unit, the input device cables and the cable to the control unit being physically secured in position and electrically connected together by a cable connector means retained in said gap.

12. A display workstation according to claim 11, wherein the cable securing means is releasably retained in said gap and the peripheral device cables are releasably coupled to the cable securing means.

* * * * *